(12) United States Patent
Miyaji et al.

(10) Patent No.: US 7,104,765 B2
(45) Date of Patent: Sep. 12, 2006

(54) HYBRID COMPRESSOR SYSTEM

(75) Inventors: Toshikatsu Miyaji, Sano (JP);
Yasuhiro Sakurai, Sano (JP); Hideyuki Takasaki, Ibaragi (JP)

(73) Assignee: Calsonic Kansei Corporation, Tokyo (JP)

(*) Notice: Subject to any disclaimer, the term of this patent is extended or adjusted under 35 U.S.C. 154(b) by 0 days.

(21) Appl. No.: 10/789,925

(22) Filed: Feb. 27, 2004

(65) Prior Publication Data

US 2004/0237556 A1  Dec. 2, 2004

(30) Foreign Application Priority Data

Feb. 27, 2003  (JP) ............................. P2003-050689

(51) Int. Cl.
*F04B 49/00* (2006.01)
*F04B 35/06* (2006.01)

(52) U.S. Cl. ........................ 417/223; 417/374
(58) Field of Classification Search ............... 417/374, 417/223, 319, 16
See application file for complete search history.

(56) References Cited

U.S. PATENT DOCUMENTS 5,867,996 A * 2/1999 Takano et al. ............... 62/175
6,234,769 B1 * 5/2001 Sakai et al. .................. 417/374
6,351,957 B1 * 3/2002 Hara ............................ 62/133
6,354,821 B1   3/2002 Hahn et al.
6,501,190 B1 * 12/2002 Seguchi et al. ............... 290/46
6,619,929 B1 * 9/2003 Adaniya et al. ............. 417/223
6,638,027 B1 * 10/2003 Mohrmann ................. 417/223
2002/0187052 A1  12/2002 Adaniya et al.

FOREIGN PATENT DOCUMENTS

EP   1 316 452 A2   6/2003
JP   10-291415      11/1998

* cited by examiner

*Primary Examiner*—Charles G. Freay
(74) *Attorney, Agent, or Firm*—Brenda O. Holmes; Kilpatrick Stockton LLP

(57) ABSTRACT

The present invention provides a hybrid compressor system in which its configuration is simplified, its cost and size are reduced, and its reliability is enhanced. In the hybrid compressor system which selectively transmits a driving force of an engine and a driving force of a motor being mounted on a vehicle to a compressor of a vehicle air conditioning device to drive the compressor, the motor is provided with a one-way clutch which selectively transmits the driving force of the motor to the compressor 1.

1 Claim, 2 Drawing Sheets

HYBRID COMPRESSOR SYSTEM

CROSS-REFERENCE TO RELATED APPLICATIONS

This application claims benefit of priority under 35 USC §119 to Japanese Patent Application No. 2003-050689, filed on Feb. 27, 2003, the entire contents of which are incorporated by reference herein.

BACKGROUND OF THE INVENTION

The present invention relates to a hybrid compressor system mounted in a vehicle which stops a vehicle-driving power source during idling for selectively transmitting a driving force of the vehicle-driving power source and a driving force of a motor mounted on the vehicle to a compressor of a vehicle air conditioning device, thereby driving the compressor.

In a related hybrid compressor system, it is proposed to transmit a driving force of an engine to a compressor by engaging or disengaging an electromagnetic clutch, and to transmit a driving force of a motor to the compressor by engaging or disengaging a one-way clutch. The one-way clutch is brought into a transmitting(connecting) state when the motor is driven, and is brought into an idling(disconnecting) state when the engine is driven.

SUMMARY OF THE INVENTION

In the related art, however, the one-way clutch is provided on an inner peripheral side of a pulley to which the driving force of the engine is transmitted and is disposed between bearings. Thus, there are problems that a configuration of the driving force transmitting mechanism that is added to the compressor becomes complicated and thus, its cost is increased, and the driving force transmitting mechanism is increased in size in both radial and axial directions of a rotation shaft of the compressor.

Since the one-way clutch is disposed in a small space, a diameter of the one-way clutch is set small. Thus, there is a problem that when the compressor rotates at a high speed, seizure is prone to be generated.

The present invention has been accomplished in view of the above problems, and the present invention provides a hybrid compressor system in which a configuration of the system is simplified, a size thereof is reduced, and a reliability of the system is enhanced.

According to a technical aspect of the present invention, in a hybrid compressor system for selectively transmitting a driving force of a vehicle-driving power source and a driving force of an auxiliary power source to a compressor of a vehicle air conditioning device, the system comprises a one-way clutch which selectively transmits the driving force of the auxiliary power source, and the one-way clutch is mounted on the motor.

DESCRIPTION OF THE PREFERRED EMBODIMENT

Figure 1:
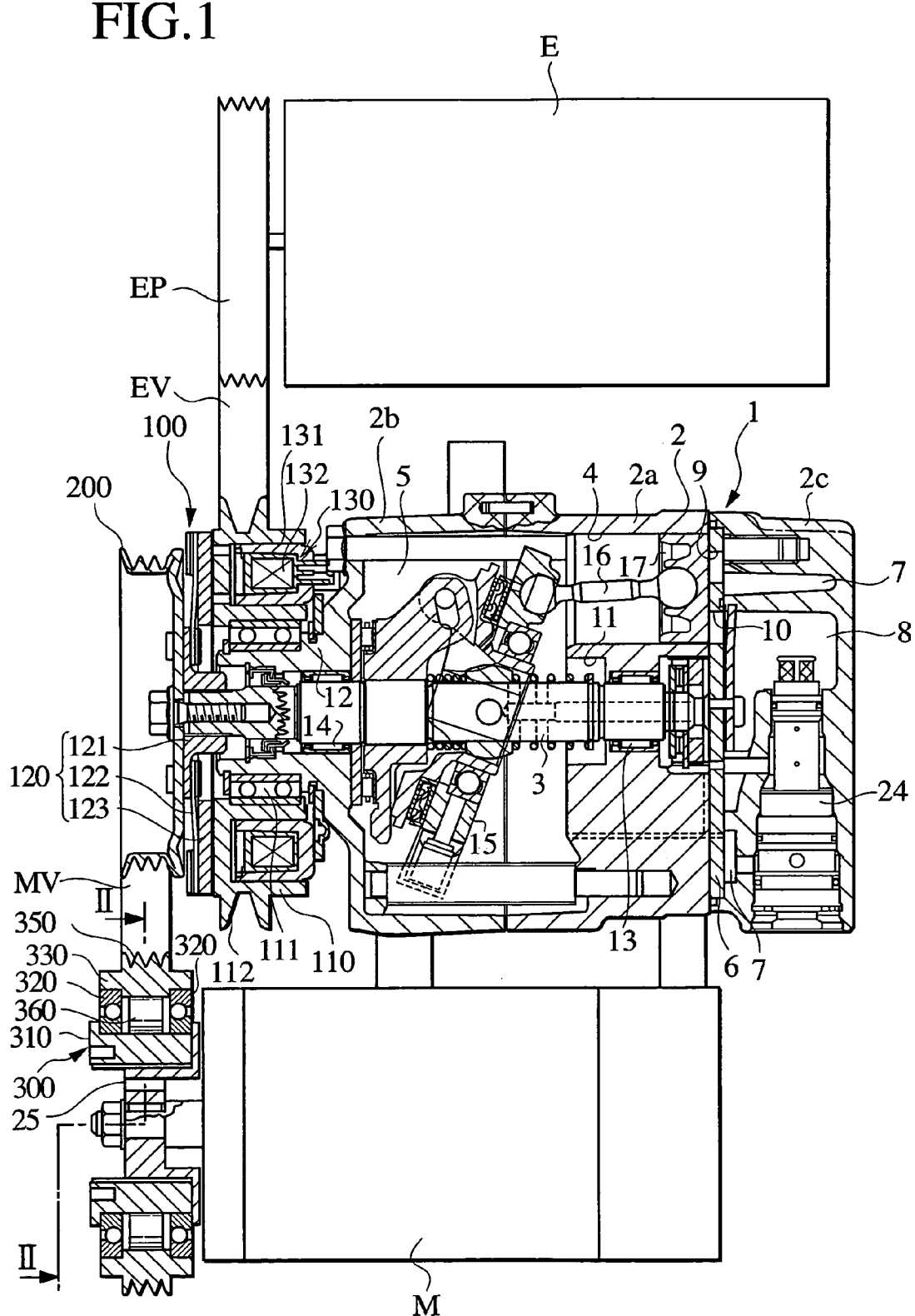
FIG. 1 is a partially cut-away side view of a hybrid compressor system according to an embodiment of the present invention.
Figure 2:
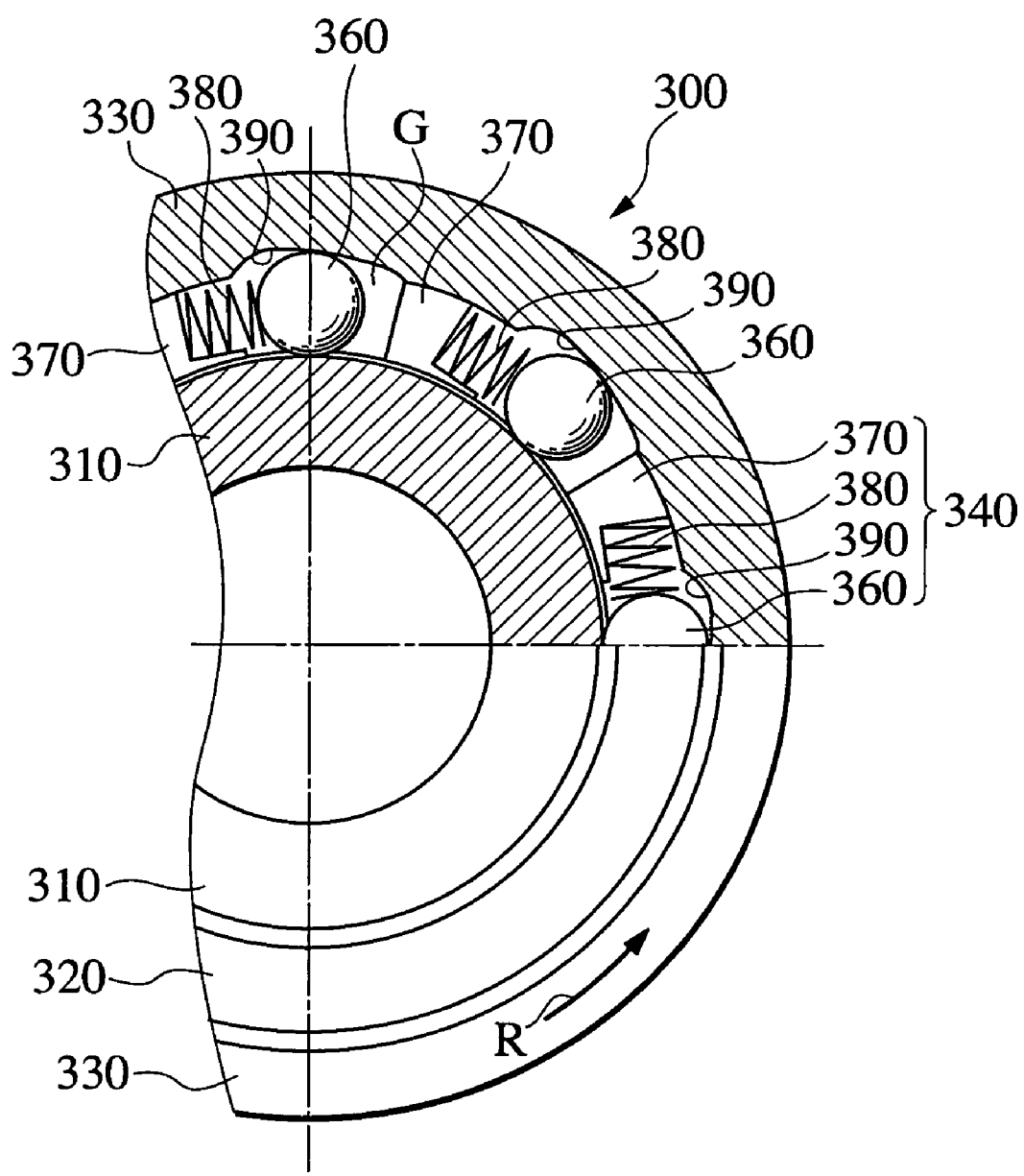
FIG. 2 is a sectional view taken along the line II—II in FIG. 1.

An embodiment of the present invention will be explained based on the drawings. FIG. 1 is a partially cut-away side view of a hybrid compressor system according to an embodiment of the present invention, and FIG. 2 is a sectional view taken along the line II—II in FIG. 1.

The hybrid compressor system is used in an idling stop vehicle. In this system, a compressor 1 is selectively driven by two driving sources, i.e., an engine E as a vehicle-driving power source and a motor M as an auxiliary power source mounted in the vehicle.

The compressor 1 is of a variable-capacitance type and includes a compression mechanism which compresses a refrigerant by rotation of a rotation shaft 3. A housing 2 includes a cylinder block 2a having a plurality of cylinder bores 4, a front housing 2b which is connected to a front end surface of the cylinder block 2a to form a crank case 5 between the cylinder block 2a and the front housing 2b, and a rear housing 2c connected to a rear end surface of the cylinder block 2a through a valve plate 6.

A suction chamber 7 and a discharge chamber 8 are formed in the rear housing 2c by a division wall. The suction chamber 7 is in communication with the cylinder bore 4 through a suction hole 9 having a valve mechanism, and the discharge chamber 8 is in communication with the cylinder bore 4 through a discharge hole 10 having a valve mechanism.

The rotation shaft 3 is rotatably supported by an inner peripheral surface of a through hole 11 formed in a central portion of the cylinder block 2 and by an inner peripheral surface of a cylindrical support section 12 formed on a front end of the front housing 2b through bearings 13 and 14. A front end of the rotation shaft 3 projects from the support section 12 outside the housing 2.

The compression mechanism is disposed in the crank case 5. The compression mechanism includes a rocking plate 15 which is non-rotatably and rockably mounted on the rotation shaft 3, and a piston 17 which is connected to the rocking plate 15 through a piston rod 16 and which reciprocates in the cylinder bore 4 by the rocking motion of the rocking plate 15. Therefore, if the rotation shaft 3 rotates, the piston 17 reciprocates in the cylinder bore 4 and with this motion, a refrigerant drawn into the cylinder bore 4 from the suction chamber 7 through the suction hole 9 is compressed, and is discharged into the discharge chamber 8 through the discharge hole 10.

The rear housing 2c is provided with pressure control means 24 which is in communication with the crank case 5, the suction chamber 7, and the discharge chamber 8, and which controls pressure in these crank case 5, suction chamber 7, and discharge chamber 8. The inclination angle of the rocking plate 15 is adjusted by the pressure control means 24 and the discharge amount of the refrigerant is adjusted.

An electromagnetic clutch 100 includes a rotor 110, an armature 120, and a coil section 130. The rotor 110 is formed into an annular shape, and is rotatably supported by an outer peripheral surface of the support section 12 of the front housing 2b of the compressor 1 through a bearing 111. A cross section of the rotor 110 is formed into a C-shape such that the rotor 110 opens rearward, and a V-shaped groove 112 is formed in the outer peripheral surface of the rotor 110. A V-belt EV is wound around the groove 112 and an outer peripheral surface of a drive pulley EP mounted on an output shaft of the engine E.

The armature 120 includes a substantially disk-like hub 121 fitted into a tip end of the rotation shaft 3, a flexible member 122 fixed to the hub 121, and a metal clutch plate 123 mounted on the flexible member 122 such as to be opposed to a front end surface of the rotor 110.

The coil section 130 has a coil 132 made of resin. The coil 132 is formed by molding in a stator 131 accommodated in the rotor 110. The coil section 130 is energized and dienergized upon reception of a signal from a clutch control circuit (not shown). If the coil section 130 is energized, a front end surface of the rotor 110 and the clutch plate 123 of the armature 120 are connected to each other, and the rotation shaft 3 is rotated by a driving force from the engine E.

A pulley 200 is fixed to a front end surface of the hub 121. A belt MV is wound around an outer peripheral surface of the pulley 200 and an outer peripheral surface of an outer ring 330 of the one-way clutch 300 mounted on an output shaft of the motor M.

The one-way clutch 300 comprises an inner ring 310 concentrically fixed to the output shaft of the motor through an annular mounting member 25, an outer ring 330 concentrically and rotatably disposed on an outer side of the inner ring 310 through a bearing 320, and interrupting means 340 (see FIG. 2) which brings the inner ring 310 and the outer ring 330 into connection with each other such that a force is transmitted therebetween, and which releases the connection by centrifugal force.

A V-shaped groove 350 is formed in the outer peripheral surface of the outer ring 330. The belt MV is wound around the groove 350 and the outer peripheral surface of the pulley 200. That is, the outer ring 330 also functions as a pulley, and this simplifies the configuration and reduces the size of the system.

As shown in FIG. 2, the interrupting means 340 is provided in an annular gap G formed between the inner ring 310 and the outer ring 330. That is, the interrupting means 340 includes a plurality of rollers 360. The rollers 360 are arranged in the gap G at constant distances from one another in the circumferential direction and can move in the circumferential direction. The interrupting means 340 also includes spring seats 370 which are adjacent to the rollers 360 in the rotational direction (direction of an arrow R) and which are fixed to the outer ring 330. The interrupting means 340 also includes springs 380 respectively mounted on the spring seats 370 for biasing the roller 360 in a direction opposite from the rotational direction.

Notches 390 on which the rollers 360 slide are provided in an inner periphery of the outer ring 330. Each of the notches 390 is formed such that its depth increases toward the rotational direction R. The rollers 360 are pushed against the notches 390 and the outer peripheral surface of the inner ring 310 by the springs 370. If the motor M is driven, the outer ring 330 rotates in unison with the inner ring 310 by wedge effect between the notches 390 and the inner ring 310.

When a rotational speed of the engine E becomes equal to or higher than a predetermined speed, each roller 360 pushes and compresses the spring 370 by a centrifugal force corresponding to the angular rotational speed and the rollers 360 enter the deep portions of the notches 390, and the rollers 360 are separated from the outer peripheral surface of the inner ring 310. With this motion, the connection between the inner ring 310 and the outer ring 330 is released and thus, the outer ring 330 idles with respect to the inner ring 310, and the transmission of the driving force from the motor M to the pulley 200 of the compressor 1 is cut off.

The hybrid compressor system is controlled by an ECU having a clutch control circuit, a motor control circuit, a discharge capacity control circuit and the like. The control operation win be explained based on running states of an idling stop vehicle.

(1) Engine Stop State in Which Air Conditioner is OFF

In a vehicle having this hybrid compressor system, if a transmission is put into neutral and a clutch pedal is released for waiting at stoplights for example, the engine is stopped. If an air conditioner switch is OFF when the engine E is stopped, the motor M is stopped.

(2) Engine Stop State in Which Air Conditioner is ON

If the air conditioner switch is turned ON when the engine is stopped, the motor Mis driven by the motor control circuit. The driving force of the motor M is transmitted to the pulley 200 through the one-way clutch 300 and the belt MV, the rotation shaft 3 rotates and the compressor 1 actuates. At that time, the electromagnetic clutch 100 is OFF by the clutch control circuit.

(3) Idling State

If the clutch pedal is depressed in the neutral position of the transmission from the engine stop state (2), the engine E starts and runs at idle. In this state, the electromagnetic clutch 100 remains OFF by the clutch control circuit and the rotation shaft 3 is driven by the motor M. The angular rotational speed of the pulley 200 by the motor M is set slightly higher than the angular rotational speed of the rotor 110 of the engine E in its idling state.

(4) Transition From Idling State to Normal Running State

If the vehicle starts from the idling state (3), the number of revolutions of the engine E is increased. At the instant when the angular rotational speed of the rotor 110 by the engine E becomes equal to the angular rotational speed of the pulley 200 by the motor M, the electromagnetic clutch 100 is engaged by the clutch control circuit. In a case where the angular rotational speed of the pulley 200 becomes equal to the predetermined speed or higher, the outer ring 330 of the one-way clutch 300 idles with respect to the inner ring 310, the transmission of the driving force from the motor M to the pulley 200 is cut off, and the rotation shaft 3 is rotated only by the driving force of the engine E. When the electromagnetic clutch 100 is engaged, the motor driving circuit turns the motor M OFF at the same time. Therefore, the rotation speed of the motor M is gradually reduced and the motor M stops finally.

(5) Transition From Normal Running State to Idling State

If the number of revolutions of the engine E is reduced from the normal running state and approaches the idling rotation, the motor M first starts. In a case where the number of revolutions of the engine E is further reduced from the above state and the angular rotational speed of the rotor 110 becomes equal to the angular rotational speed of the pulley 200, the electromagnetic clutch 100 is disengaged by the clutch control circuit at this instance, and the engine driving state is shifted to the motor driving state.

According to the present invention, the motor M is provided with the one-way clutch 300, and the rotor 110 to which the driving force from the engine E is transmitted can be reduced in size in both radial direction and axial direction of the rotation shaft 3. Only the pulley 200 having the simple configuration can function as the transmitting mechanism of the driving force from the motor M added to the compressor 1, the transmitting mechanism of the driving force added to the compressor 1 is reduced in size and its configuration is simplified, and the cost is reduced.

According to the present invention, by providing the motor M with the one-way clutch 300, it is possible to use the one-way clutch 300 whose large-diameter outer ring idle, in which seizure is less prone to be generated even at a high speed rotation, thus enhancing the reliability. Since the one-way clutch 300 is of centrifugal force type, there is a merit that its configuration is simple and its size is small as compared with a one-way clutch of another type.

Since the centrifugal force type one-way clutch having the simple configuration is used, the cost and the size are further reduced.

Further, since the outer ring 330 of the one-way clutch 300 also functions as the pulley, the configuration is further simplified, and the cost and the size are further reduced.

The present invention can also be applied to a hybrid compressor system using a vehicle-driving power source other than engine.

Further, various changes and modifications may be made without departing from the spirit and scope of the invention.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A hybrid compressor system for selectively transmitting a driving force of a vehicle-driving power source and a driving force of an auxiliary power source to a compressor of a vehicle air conditioning device, comprising:

a clutch selectively transmitting the driving force of the vehicle-driving power source directly to the compressor from the vehicle-driving vower source and a one-way clutch selectively transmitting the driving force of the auxiliary power source to the compressor, the one-way clutch being mounted on the auxiliary power source, wherein the one-way clutch includes:

an inner ring fixed to an output shaft of the auxiliary power source;

an outer ring being concentrically and rotatably disposed on an outer side of the inner ring; and an interrupting means connecting the inner ring and the outer ring such that the driving force of the auxiliary power source is transmitted therebetween, and that the connection is released when a centrifugal force exceeds a predetermined value corresponding to the rotation of the outer ring, and wherein the outer ring is a pulley; and a belt for transmitting the driving force of the auxiliary power source to the compressor is wound around the pulley.

* * * * *